US010585954B2

(12) United States Patent
Brown et al.

(10) Patent No.: US 10,585,954 B2
(45) Date of Patent: Mar. 10, 2020

(54) REAL-TIME DATA INPUT RELEVANCE RANKING AND RESULTING DATA OUTPUT

(71) Applicant: Pacific Wave Technology Inc., Henderson, NV (US)

(72) Inventors: Wendell Brown, Henderson, NV (US); Evan Tann, Manitou Beach, MI (US)

(73) Assignee: Pacific Wave Technology, Inc., Henderson, NV (US)

( * ) Notice: Subject to any disclaimer, the term of this patent is extended or adjusted under 35 U.S.C. 154(b) by 17 days.

(21) Appl. No.: 14/481,674

(22) Filed: Sep. 9, 2014

(65) Prior Publication Data

US 2015/0074197 A1    Mar. 12, 2015

Related U.S. Application Data

(60) Provisional application No. 61/875,629, filed on Sep. 9, 2013.

(51) Int. Cl.
| | | |
|---|---|---|
| G06Q 30/00 | (2012.01) | |
| G06F 3/048 | (2013.01) | |
| G08G 1/0968 | (2006.01) | |
| G06F 16/9535 | (2019.01) | |
| H04L 29/08 | (2006.01) | |
| H04W 4/21 | (2018.01) | |
| H04W 4/80 | (2018.01) | |
| G06F 16/435 | (2019.01) | |
| G06N 3/00 | (2006.01) | |
| G06Q 30/02 | (2012.01) | |

(52) U.S. Cl.
CPC ........ G06F 16/9535 (2019.01); G06F 16/435 (2019.01); G06N 3/006 (2013.01); H04L 67/12 (2013.01); H04L 67/22 (2013.01); H04W 4/21 (2018.02); H04W 4/80 (2018.02); G06Q 30/0254 (2013.01); G06Q 30/0261 (2013.01)

(58) Field of Classification Search
CPC ........................... G06Q 30/02; G06Q 30/0254
See application file for complete search history.

(56) References Cited

U.S. PATENT DOCUMENTS

| 2003/0060974 A1* | 3/2003 | Miyahara | G08G 1/096811 701/533 |
|---|---|---|---|
| 2005/0234877 A1* | 10/2005 | Yu | G06F 7/00 |
| 2012/0158499 A1* | 6/2012 | Banadaki | G06Q 30/0254 705/14.52 |
| 2012/0197724 A1* | 8/2012 | Kendall | G06Q 30/0261 705/14.58 |
| 2013/0290905 A1* | 10/2013 | Luvogt | G06N 3/006 715/835 |
| 2014/0006129 A1* | 1/2014 | Heath | G06Q 30/0222 705/14.23 |

* cited by examiner

Primary Examiner — Hee Soo Kim
Assistant Examiner — Ho T Shiu
(74) Attorney, Agent, or Firm — Alston & Bird LLP

(57) ABSTRACT

Techniques are presented for ranking and presenting information to a user. In one example, a portable computing device may collect a first set of data from one or more sensors, rank a second set of data (e.g., advertisements, news, etc.) by correlating the first set of data with a third set of data of interest to a user, and present the ranked information to the user. In another example, the portable computing device may transmit the collected information to a server for processing, and receive the ranked information from the server.

51 Claims, 10 Drawing Sheets

REAL-TIME DATA INPUT RELEVANCE RANKING AND RESULTING DATA OUTPUT

CROSS-REFERENCE TO RELATED APPLICATIONS

This application claims benefit under 35 USC 119 (e) of U.S. Provisional Application No. 61/875,629, entitled "Real-Time Data Input Relevance Ranking and Resulting Data Output," filed Sep. 9, 2013, and incorporated herein by reference in its entirety.

TECHNICAL FIELD

The present invention relates generally to a method and system for producing a real-time stream of information associated with inputs from a portable-computing device, and in particular to producing a real-time stream of information associated with inputs from a wearable-computing device.

BACKGROUND

An advertisement, hereinafter also referred to as an "ad," is used to market and sell a product or service. Typical ads contain primary information in the form of text, images and/or audio information about a product or service. The primary information in the ad may also contain information, such as a toll-free 800 number, a website address, a physical street address, or another means of action, that provides a way for the viewer or listener to take an action to either buy the product or obtain more supplemental information related to the product. Magazine and video ads, roadside billboards, street-level ads, ads on vehicles such as taxis, buses, cars, and the like, contain similar information.

Online advertisement has increased significantly in recent years. The large amount of advertisements and/or feed information available to a user could be confusing and/or overwhelming. At the same time, size of available screens on portable computing devices has reduced (from laptops with relatively large screen size to smartphones and/or other wearable computing devices with relatively small screen size). There is a need in the art to use the available screen size and other output devices more efficiently to present information to a user.

BRIEF DESCRIPTION OF THE DRAWINGS

An understanding of the nature and advantages of various embodiments may be realized by reference to the following figures. In the appended figures, similar components or features may have the same reference label.

SUMMARY

Figure 1:
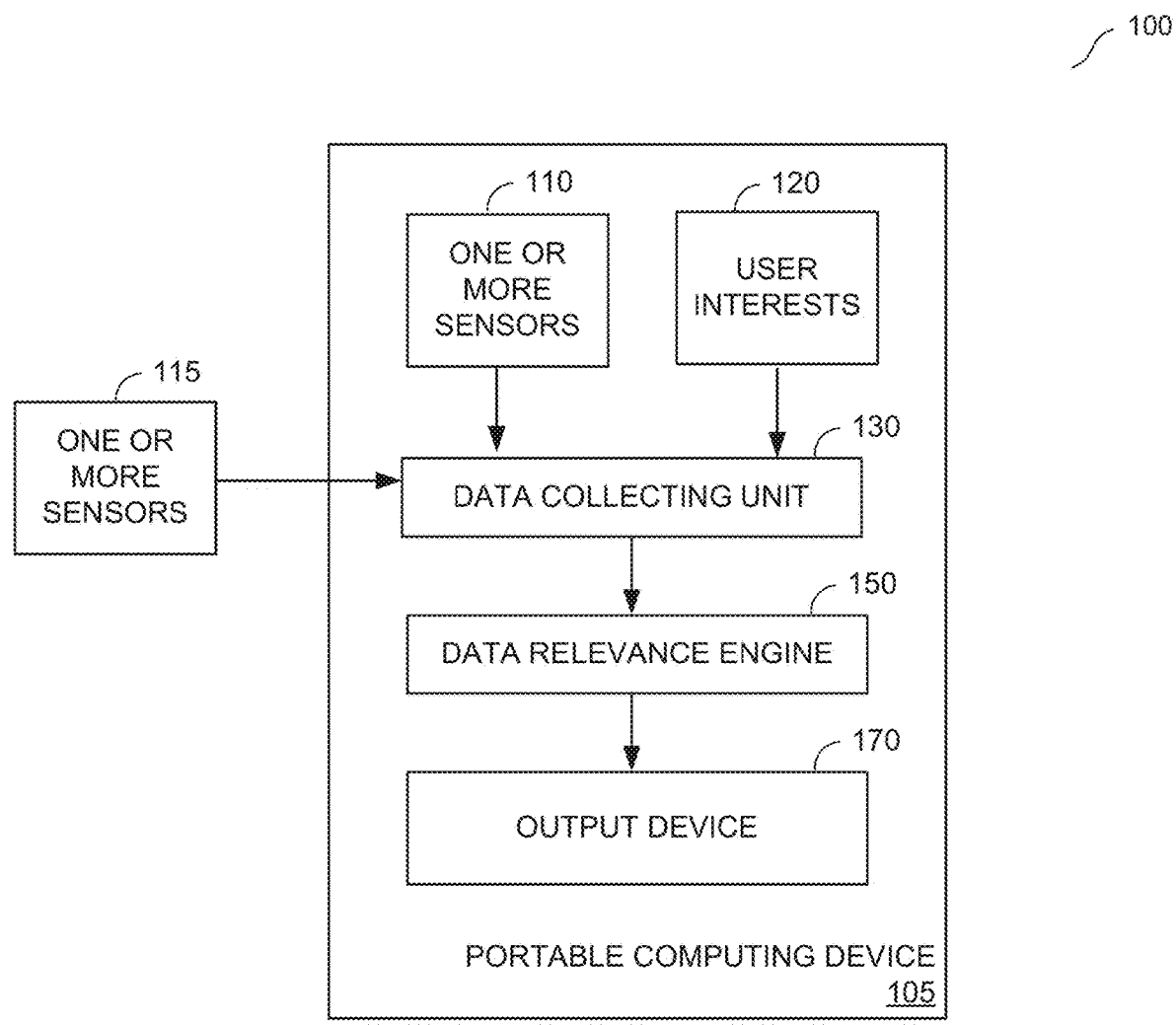
FIG. 1 shows various blocks of an exemplary portable computing device, according to one embodiment of the present invention.

In one embodiment, a method for generating a ranked stream of data by a server (e.g., a cloud computing server) is disclosed. The method includes, in part, receiving a first set of data from a portable computing device, and ranking a plurality of elements in a second set of data (e.g., advertisement information, news feed, user-specific information, etc.) based on a plurality of metrics. The plurality of metrics are defined by correlations between the first set of data and a third set of data of interest to a user. In one embodiment, the first set of data corresponds to measurements performed by one or more sensors. The method further includes transmitting one or more of the ranked elements in the second set of data to the portable computing device.

In one embodiment, the server receives the third set of data from the portable computing device. In another embodiment, the server already has some information corresponding to interest of user. In on embodiment, the third set of data comprises information corresponding to social network activities of the user. The third set of data may further include information corresponding to social network activities of one or more users associated with the user in a social network (e.g., friends, colleagues, family, etc.).

In one embodiment, ranking the plurality of elements in the second set of data includes categorizing the plurality of elements in the second set of data using a classifying algorithm and generating the plurality of metrics corresponding to the plurality of elements using a collaborative filtering algorithm.

In one embodiment, the server receives a feedback from the portable computing device corresponding to at least one of the elements in the third set of data and updates the plurality of metrics in accordance with the feedback.

In one embodiment, the plurality of elements in the second set of data are ranked in real-time.

In one embodiment, a method for obtaining a ranked stream of data by a portable computing device is disclosed. The method includes, in part, transmitting a first set of data to a server and receiving one or more ranked elements from the server. The first set of data corresponds to measurements performed by one or more sensors. The one or more ranked elements are selected from a second set of data corresponding to correlations between the first set of data and a third set of data of interest to a user. The method further includes presenting the one or more ranked elements to the user by the portable computing device.

In one embodiment, a method for generating a ranked stream of data by a portable computing device is disclosed. The method includes, in part, obtaining a first set of data from one or more sensors, obtaining a second set of data of interest to a user of the portable computing device, and ranking a plurality of elements in a third set of data based on a plurality of metrics. The plurality of metrics are defined by correlations between the first set of data and the second set of data. The method further includes presenting one or more of the ranked elements in the third set of data to the user.

In one embodiment, an computer system is disclosed. The computer system is generally configured to receive a first set of data from a portable computing device. The first set of data corresponds to measurements performed by one or more sensors. The computer system is further configured to rank a plurality of elements in a second set of data based on a plurality of metrics defined by correlations between the first set of data and a third set of data of interest to a user, and transmit one or more of the ranked elements in the second set of data to the portable computing device.

In one embodiment, a portable communication/computing device is disclosed. The portable communication/computing device is generally configured to transmit a first set of data to a server. The first set of data corresponding to measurements performed by one or more sensors. The portable communication/computing device is further configured to receive one or more ranked elements from the server. The one or more ranked elements being selected from a second set of data corresponding to correlations between the first set of data and a third set of data of interest to a user. The portable communication/computing device is further configured to present the one or more ranked elements to the user.

In one embodiment, a portable communication/computing device is disclosed. The portable communication/computing device is generally configured to obtain a first set of data from one or more sensors and obtain a second set of data of interest to a user of the portable communication/computing device. The portable communication/computing device is further configured to rank a plurality of elements in a third set of data based on a plurality of metrics defined by correlations between the first set of data and the second set of data, and present one or more of the ranked elements in the third set of data to the user.

In one embodiment, a non-transitory computer-readable medium is disclosed. The non-transitory computer-readable medium includes, in part, computer readable instructions configured to cause a processor to receive a first set of data from a portable computing device. The first set of data corresponds to measurements performed by one or more sensors. The computer readable instructions are further configured to cause the processor to rank a plurality of elements in a second set of data based on a plurality of metrics defined by correlations between the first set of data and a third set of data of interest to a user, and transmit one or more of the ranked elements in the second set of data to the portable computing device.

In one embodiment, a non-transitory computer-readable medium is disclosed. The non-transitory computer-readable medium includes, in part, computer readable instructions configured to cause a processor to transmit a first set of data to a server and receive one or more ranked elements from the server. The first set of data corresponds to measurements performed by one or more sensors. The one or more ranked elements being selected from a second set of data corresponding to correlations between the first set of data and a third set of data of interest to a user. The computer readable instructions are further configured to cause a processor to present the one or more ranked elements to the user.

In one embodiment, a non-transitory computer-readable medium is disclosed. The non-transitory computer-readable medium includes, in part, computer readable instructions configured to cause a processor to obtain a first set of data from one or more sensors, obtain a second set of data of interest to a user of a portable communication/computing device, rank a plurality of elements in a third set of data based on a plurality of metrics defined by correlations between the first set of data and the second set of data, and present one or more of the ranked elements in the third set of data to the user.

DETAILED DESCRIPTION

Several illustrative embodiments will now be described with respect to the accompanying drawings, which form a part hereof. While particular embodiments, in which one or more aspects of the disclosure may be implemented, are described below, other embodiments may be used and various modifications may be made without departing from the scope of the disclosure or the spirit of the appended claims. The word "exemplary" is used herein to mean "serving as an example, instance, or illustration." Any embodiment or design described herein as "exemplary" is not necessarily to be construed as preferred or advantageous over other embodiments or designs.

As used herein, the term "portable computing/communication device" or "mobile device" may be used interchangeably to refer to a computing/communication device that is portable and can be moved from one place to another. For example, a portable computing device may be a cellular telephone, cell-phone, smartphone, tablet, wireless communication device, laptop computer, mini-laptop, pad, mini-tablet, mini-pad, personal digital assistant (PDA), personal audio device (PAD), head-mount display (HMD), and/or other portable devices. The portable-computing device may include a processor and one or more sensors. A portable-computing device may further include one or more wearable-computing devices. A wearable-computing device may include any of an eyeglass, an ear-piece, a wristband, a wrist-device, a medallion, a device worn around the neck, an arm band, an arm-device, a device worn on the head such as a hat, a piece of clothing such as a shirt, a pair of pants, a scarf, and the like, a piece of outer clothing such as a coat, jacket, or the like, and any other wearable-computing devices, which include a processor and one or more sensors. Accordingly, a wearable-computing device is different from a laptop, which is not worn on a user's body.

Portable computing devices contain a variety of sensors and data input devices. Typical information, hereinafter also referred to as "data," from portable-computing devices includes global positioning system (GPS) location information, wireless network status, mobile cell phone tower location, device acceleration, audio inputs, video inputs, fingerprint sensors, ambient light inputs, information about other devices associated or nearby the user's portable-computing device, e.g., tethered Bluetooth® devices, and/or the like.

A user of such portable-computing devices may be associated with various online social accounts or networks, such as Facebook, Twitter, LinkedIn and other similar accounts and/or networks. Online social account information may include a user's likes and dislikes, that may represent the user's interests. Some online social account information is fed or streamed to a user's portable-computing device as an information feed based on #hashtags, e.g., keywords that relate to the user's interests.

In one embodiment, information from a multitude of sources may be correlated, filtered, selected and/or ranked according to a user's interests and/or current environment, in real-time. The information from the multitude of sources may include real-time data inputs and/or non-real-time data inputs. Real-time input may refer to an input, such as a sensor reading, corresponding to an event at the actual time that the event happens. In addition, processing an input in "real-time" refers to a substantially small amount of delay between receiving an input by a device, and processing the input and generating a corresponding output.

In one embodiment, the ranked information, such as feeds, tweets, ads and/or the like, may be output on a portable-computing device in real-time. The user is thus presented with more useful or relevant real-time output data than currently possible with existing internet search techniques that, in-contrast, input and output static web pages that may not be current or even active, nor take into consideration the user's environment in real-time. In one embodiment, the user's interests are declared interests, such as through active or passive feedback from the user. In another embodiment, the user's interests may be predicted or anticipated automatically. In one embodiment, the information from the multitude of sources may be streamed information. In another embodiment, the information from the multitude of sources may not be streamed information. In one embodiment, the output data may be streamed information. In another embodiment, the output data may not be streamed information.

FIG. 1 shows various blocks of an exemplary portable computing device, according to one embodiment of the present invention. As illustrated, the portable computing device 100 receives data corresponding to measurements from one or more sensors 110, 115. The portable computing device in real-time senses primary information about the environment in the local vicinity, line-of-sight, and/or hearing distance adjacent the portable computing device via the one or more sensors. Primary information may refer to the information that can be directly sensed from the local environment in real-time, such as an ad that is sensed by visual, audio, or electronic means by the portable-computing device or the user. Further, primary information may be data requested by the user through the portable-computing device such as a feed, tweet, web page, e-mail, or the like. The sensors on the portable computing device sense primary information such as device acceleration, motion, audio, video, fingerprint, heart rate, breathing rate, retina scan, and/or other biometric information, ambient light, near-field communication, wireless network status, infrared, ultrasonic, gyroscopic, orientation, and/or the like.

In general, the portable-computing device may include a multitude of such sensors to sense information associated with the user's environment in real-time. Further, a sensor may be associated with the portable-computing device through another portable device or second portable-computing device that is different than but tethered wirelessly or by wire to a first portable-computing device in various combinations. In other words, a sensor need not be on the user's first portable-computing device but may be associated with the user's first portable-computing device. For example, an audio microphone may be located on an earpiece wirelessly connected to a first portable-computing device, such as a smart-phone having a video camera sensor. A bicycle speedometer type portable-computing device on a bicycle may be further added to the first portable-computing device's sensor network.

In addition, the portable computing device collects information corresponding to interests 120 of a user. The information may be collected and stored in a data collecting unit 130. The data collecting unit sends the collected information to the data relevance engine 150 for processing. The data relevance engine processes the received information and selects a set of relevant information to output on the output device 170.

Figure 2:
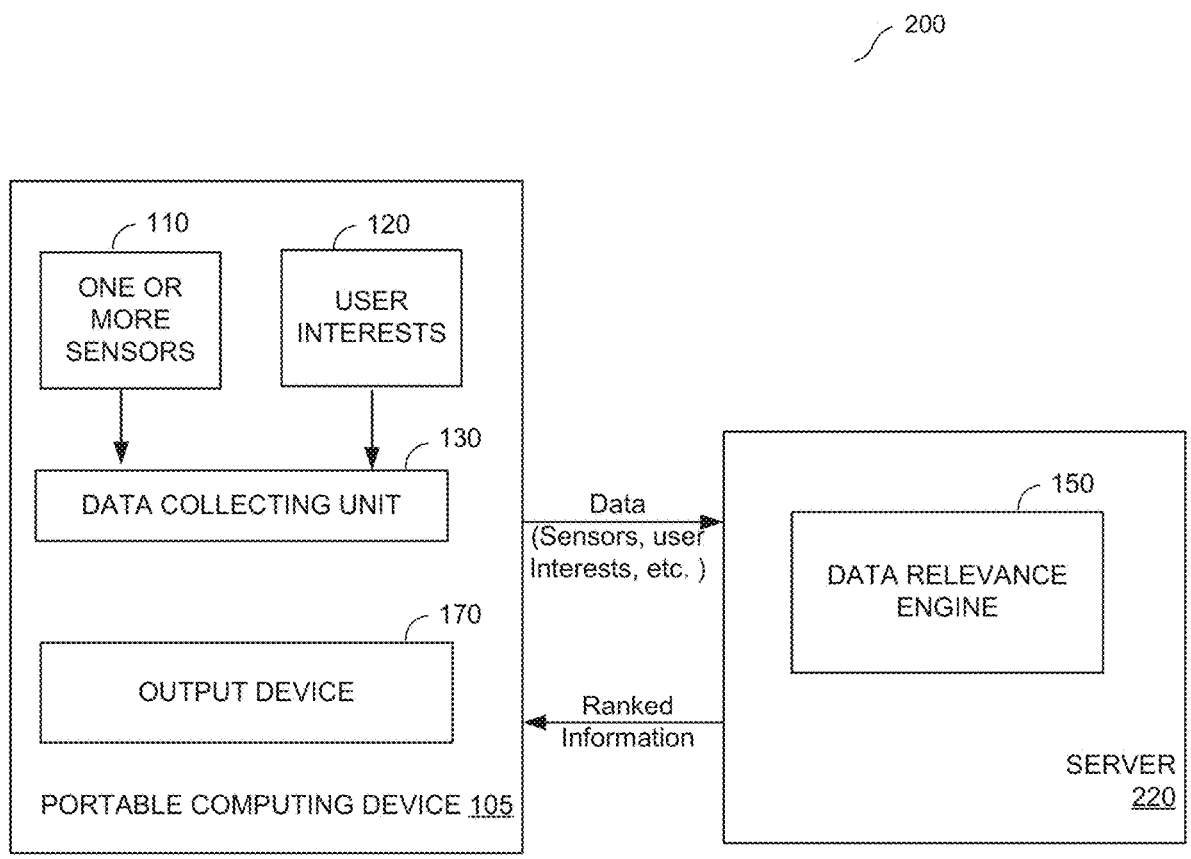
FIG. 2 shows an exemplary system including a portable computing device and a server, according to one embodiment of the present invention.

In one embodiment, as illustrated in FIG. 1, the data relevance engine is part of the portable computing device. In another embodiment, the data relevance engine is located in a server (as illustrated in FIG. 2), which receives information from the portable computing device. FIG. 2 shows an exemplary system including a portable computing device and a server, according to one embodiment of the present invention. The portable computing device 105 collects information from the sensors and/or user interests and sends them to the server. The server 220 processes the received information and ranks its available information based on their correlation with user interest and received sensor measurements. The server sends some information that has the highest relevance to the user.

Figure 3:
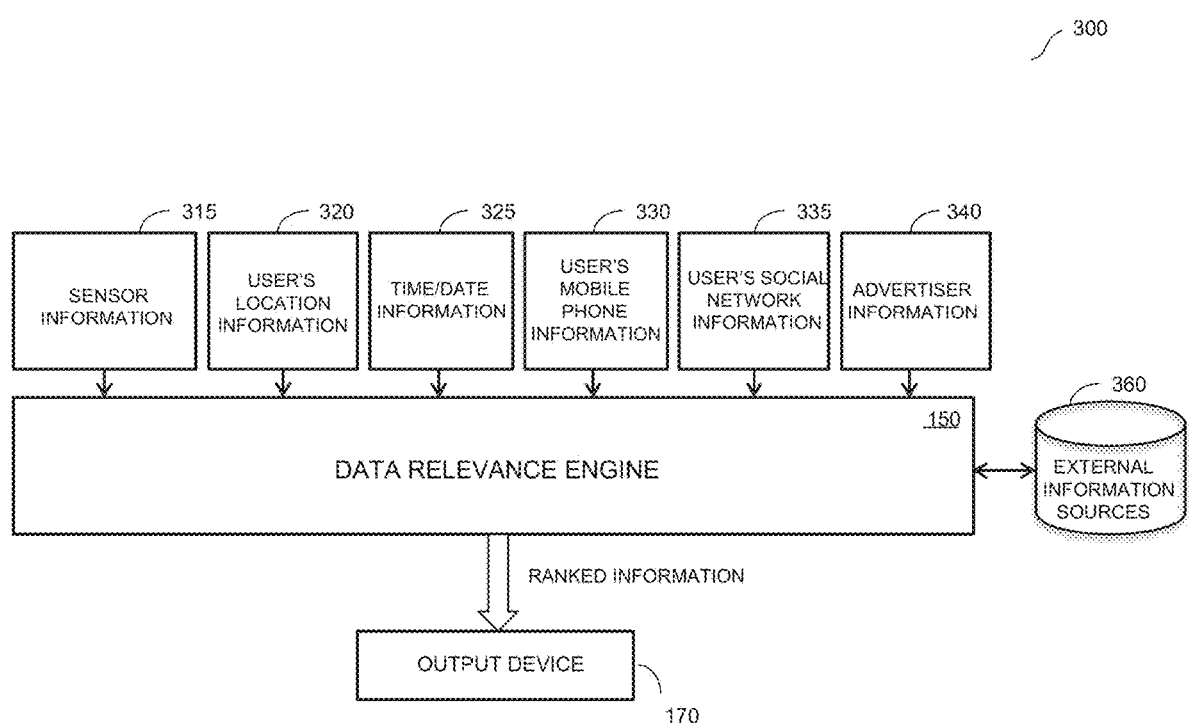
FIG. 3 shows an exemplary block diagram of a data generation system, according to one embodiment of the present invention.

FIG. 3 shows an exemplary block diagram of a data generation system, according to one embodiment of the present invention. As illustrated, a multitude of information inputs each from a different one of a multitude of sensors are sent to the data relevance engine in real-time as an information stream. Any number of sensors may be tethered in a local network to provide data of interest associated with the user's environment or where the user is located, such as on a bicycle, automobile, plane, or other transportation vehicle. Accordingly, sensors are not associated with keyboard keys or keyboard icons, nor is real time sensor data the same as data that is input via keyboard keys or keyboard icons. In one embodiment, data from a user's portable-computing device's body motion sensors are used to correlate and weight data inputs. In one embodiment, data from a user's wearable-computing device, which indicates the user's location, such as GPS information, cell phone tower, and/or the like, is used to gather, correlate, weight and then rank the output data.

The sensor information 315 is sent from the portable-computing device to a data relevance engine 150 via cable, wireless radio, infrared, internet network link, or any other method. In one embodiment, data from one or more real-time sensors is passively collected, e.g., an audio or video sensor data may be continuously transmitted in real-time, for a predetermined period of time. The predetermined period of time may be chosen by the user via controls in the portable-computing device. In one embodiment, primary sensor information is transmitted upon request or demand, or upon a timed predetermined sequence. In one embodiment, primary sensor information 315 is transmitted continuously in time as an information stream, the sensor information following the changes in the environment as the user moves through that environment, not only as geographic location changes but further including changes in the users orientation, such as what the user's wearable-computing device may be seeing or hearing in real time.

In one embodiment, the data relevance engine is a computing device located in the internet cloud, which may provide a critical advantage of not adding additional computational or data storage burdens on the portable-computing device that increases battery life and performance of the portable-computing device. In another embodiment, the data relevance engine is located in the portable-computing device (as illustrated in FIG. 1). In one embodiment, one portion of the data relevance engine is located in the internet cloud, while another portion of the data relevance engine is located in the portable-computing device. In one embodiment, the relevance engine performs calculations in one or more computing devices "in the cloud," with such computing devices connected to a user's portable, mobile, or wearable-computing-device via a wireless connection, such as a WiFi, mobile data network, Bluetooth, or similar networks, or via a wired connection, such as Ethernet.

In one embodiment, the primary information is transmitted from the portable-computing device to the data relevance engine directly. In another embodiment, the primary information is transmitted from the portable-computing device to the data relevance engine indirectly, e.g., from a wearable-computing device tethered to the portable-computing device, such as a smart phone.

In one embodiment, the primary information may include global positioning system (GPS) location 320 for the portable-computing device. The GPS location may be transmitted from the portable-computing device to the data relevance engine.

In one embodiment, the primary information may include time and/or date information 325 for the portable-computing device. The time and/or date information may be transmitted from the portable-computing device to the data relevance engine. In another embodiment, the time and/or date information is available to the data relevance engine, which then correlates or time and/or date stamps the received primary information accordingly.

In one embodiment, the primary information may include information associated with the portable-computing device 330, such as contacts, prior, e.g., historical location data of the device, email addresses, account, serial, identification, model, firmware, web address, stored photo or video, historical browser information such as prior purchases and/or payments, and/or the like. The information associated with the portable-computing device may be transmitted from the portable-computing device to the data relevance engine.

In this document, the terms "secondary information" or "supplemental" information are used to refer to information that is not primary information. In one embodiment, secondary information may be associated with a user interest from the user's social network in the cloud, such as likes, dislikes, social graphs, social graph elements, friends, thumbs up, thumbs down, email addresses, stored photo or video, product or service reviews, #hashtags, tweets and/or the like. The information associated with the user's social network, such as Facebook, may be received 335 from the cloud by the data relevance engine. In one embodiment, the user is associated with the portable-computing device.

In another embodiment, the user may not be associated with the portable-computing device. For example, the user may be a social network friend of or someone who recommends the user who is associated with the portable-computing device. Then the data may include recommendations, preferences, or interests of a user who is not associated with the portable-computing device but is still associated through the social network with the user who is associated with the portable-computing device. Thereby, the data relevance engine may have access to a multitude of user interest data from users who may share similar interests as the user associated with the portable-computing device. In one embodiment, other sensors in the user's nearby location, such as sensors associated with other nearby users, fixed sensors, and/or the like may be used as primary real-time inputs. In one embodiment, data in a user's social graph, for example such as the Facebook social graph, or other similar user data, such as the user's friends or friend's likes, are used to correlate and weight data inputs.

In one embodiment, secondary information may be associated with advertiser information or ads. The information associated with the ads may be received 340 from the cloud or from other sources by the data relevance engine.

In one embodiment, primary and/or secondary information may be associated with external information sources 360, which are linked and/or accessed by the data relevance engine. External information sources may include any kind of information source, data base or service that may push, feed, transmit, or be accessible as information to the portable-computing device not included in the information input embodiments already described above. Examples of external information sources include Yelp, Groupon, broadcasting networks, such as NBC Sports or National Public Radio, financial information services, email services, text messaging services, geographical map database services, weather reporting and/or prediction, historical information such as purchase, payment, or credit history, other websites and/or the like.

In one embodiment, primary and/or secondary data may be correlated 150 in real-time by the data relevance engine to determine the resulting information in a ranked order associated with the correlated data. In other words, the data relevance engine correlates the primary information, e.g., from the real-time sensors on the portable-computing device, with secondary information, e.g., data from social media networks, associated with a user interest, to form a correlated data. The data relevance engine then determines a resulting information as an output. The resulting information includes real-time information in a ranked order. The ranked order is associated with the correlated data.

Because the primary and/or secondary data that is included in the correlated data is associated with user interest data, the ranked order will therefore be associated with the user's interests. Further, since the primary data includes current sensor data associated with the local environment adjacent the portable-computing device, and thereby with the user, the ranked order will be associated with activities or locations the portable-computing device is encountering in real time, without requiring much, if any, input by the user. The use of the real time sensor data associated with the immediate environment of the portable-computing device provides a critical advantage that improves the relevance of the ranking over the relevance that can be obtained by previously known techniques. In one embodiment, the resulting information may be streamed continuously or periodically. In another embodiment, the resulting information may not be streamed.

In one embodiment, the data relevance engine makes its determination of the rank order automatically, without active user input, using passively collected data from primary and/or secondary data inputs that are associated with the user's interests. In another embodiment, the data relevance engine makes its determination of the rank order semi-automatically, with some active user input during a learning period for the data relevance engine or during occasional subsequent times when the user wants the output of the data relevance engine to be adjusted or changed, for example when the user's interest changes.

The resulting information and ranked order may be sent from the data relevance engine to the portable-computing device, where the ranked resulting information may be available to the user's senses. The ranked resulting information may be visually, audibly, or tactilely available to the user via the output device 170. In one embodiment, the resulting information may be presented such that the predicted most relevant data is presented first or in a form of higher visibility than less interesting data. In other embodiments, the resulting information output may be included as a standalone application or may alternatively be included in a portion of another application, e.g., a monetization/embedded stream within another application. In one embodiment, a portable-computing device's detected motion sensor information may be used to change/update/scroll/move the contents of the displayed resulting information.

In one embodiment, a multitude of advertisements that are relevant/related in real-time to the primary and/or secondary data inputs and thus selected to match the user's real-time interests may be inserted into the resulting information. In one embodiment, at least one advertisement, which is deemed to relate in real-time to at least one of the data input sources, may be presented in the resulting information output data stream (e.g., ranked information). In one embodiment, at least one merchant offer, for example such as a local daily deal, which may be deemed to relate to at least one of the data input sources, may be included in the output data stream.

In one embodiment, the resulting information may include an actionable link. For example, the actionable link may direct the user's browser to a website that may initiate a purchase of a service or product. In one embodiment, the user may select one of the items in the multitude of items included in the resulting information.

In one embodiment, a portion of the resulting information may be continuously updated in real-time. In another embodiment, a portion of the resulting information may be updated at a predetermined time when the data relevance engine determines the resulting information should be updated due to a change in one of the multitude of information inputs. In one embodiment, the resulting information may be updated periodically. In one embodiment, the ranking of the resulting information may be updated dynamically at predetermined times when the data relevance engine determines a new ranking order is appropriate due to changes in one of the multitude of information inputs.

In one embodiment, the resulting information output may be presented to the user such that the ranking value of most relevant or interesting resulting information is more easily consumed or understood by the user than the lower ranked, less interesting resulting information. In one embodiment, the resulting information may be presented visually as a list of information ranked in order from most interesting information presented first, such as at the top of a list, and the less interesting resulting information presented in sequence of a rank value, such as from top to bottom of the list with the least interesting information presented at the bottom of the list.

In another embodiment, the resulting information may be presented as audio output, such as an audio announcement presenting the most interesting resulting information first in sequence of a rank value. Less interesting information may be presented after the most important resulting information presented in sequence of a rank value, such as from first to last in the sequence with the least interesting information presented at the end of the sequence.

In one embodiment, the resulting information may be presented in a repeating sequence. In one embodiment, the repeating sequence of the resulting information may repeat the resulting information that has higher rank order at greater frequency than the less interesting resulting information with lower rank order. In one embodiment, the resulting information may be presented at a time associated with the ranking value.

In one embodiment, the resulting information may be presented in a format associated with the ranking value. In one embodiment, the format of the resulting information that has higher rank order may be presented to draw greater attention than the less interesting resulting information with lower rank order. For example, resulting information that has higher rank order may be presented in bolder, larger, flashing frequency, and/or colored font associated with the ranking value for a visual display, or by type of voice and/or volume for an audio display.

Figure 4:
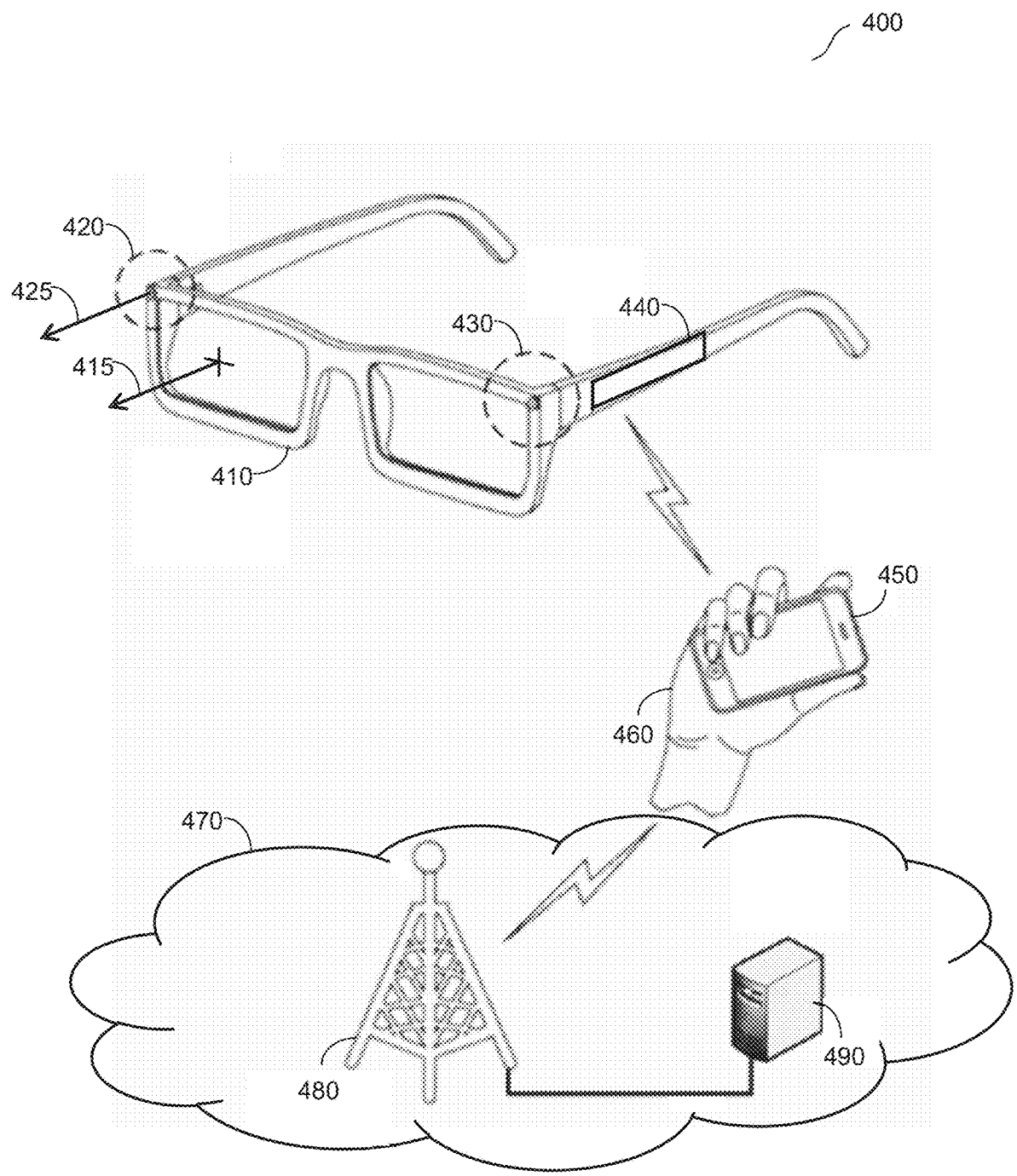
FIG. 4 shows an exemplary system including a wearable computing device and a server, according to one embodiment of the present invention.

FIG. 4 shows an exemplary system including a wearable computing device and a server, according to one embodiment of the present invention. In this example, wearable-computing device 410 includes a form factor for eyewear with one or more displays and may include a sensor such as a camera 420, and/or a microphone 430. Camera 420 may include a video and/or a still camera or multiple cameras and one or more optical axis 425 oriented such that the video camera's field of view is aligned with the line of sight of the user 415. In other words, camera 420 may see the same image the user sees through the eyewear of wearable-computing device 410. In one embodiment, the sensor may be on continuously or periodically over a predetermined period of time seeing or hearing whatever the user sees and hears in the vicinity of the user.

Wearable-computing device 410 may further include an electronic circuit 440. Electronic circuit 440 may in-turn include one or more inputs such as a touch sensor or button, a processor, a data storage, and a battery. In one embodiment, electronic circuit 440 may include a wireless radio transceiver. In one embodiment, the wireless radio transceiver may operate on low bandwidth, power saving radio transmission standards such as Bluetooth®, 6LoWPAN®, ZigBee®, DASH7®, Z-Wave®, MiWi®, or OSION®. In another embodiment, the wireless radio transceiver may operate in accordance with WiFi®, or cellular radio transmission standards. The wearable-computing device 410 may be able to project images received by electronic circuit 440 to the user wearing wearable-computing device 410 through the lenses of the eyewear such that the projected image is seen by the user superimposed over the real image as viewed by the user. Therefore, the resulting information transmitted from the data relevance engine may be visually displayed in the user's field of view on wearable-computing device 410.

In one embodiment, electronic circuit 440 may further include an audio output device, such as a speaker or bone transducer. Therefore, the resulting information transmitted from the data relevance engine may be audibly played to the user via the audio output device on wearable-computing device 410. In one embodiment, electronic circuit 440 may further include GPS, cellular location, and/or orientation circuitry, which may respectively determine the location and/or height on the earth and the orientation at that location of wearable-computing device 410. In other words, orientation circuitry may provide to wearable-computing device 410 the direction video camera 420 and the user are viewing, for example, compass or azimuth and altitude angles relative to the user. In one embodiment, electronic circuit 440 may further include a gravitational sensor and/or an accelerometer, which may provide a velocity information and/or an acceleration information for wearable-computing device 410

A portable-computing device 450 is wirelessly tethered to the wearable-computing device 210. In this example, the portable-computing device 450 is a smart phone, however, portable-computing device 450 may be any other portable computing device such as a laptop, mini, tablet, or pad, which may or may not include a wireless radio transceiver that may link or tether portable-computing device 450 to wearable-computing device 400 on user 460. In one embodiment, portable-computing device 450 may be tethered to wearable-computing device 410 via a wire and a wired communication system connecting wearable-computing device 410 to portable-computing device 450. In one embodiment, location, orientation, gravimetric and/or acceleration sensors may be included in portable-computing device 450 or distributed between wearable-computing device 410 and portable-computing device 450 in any combination. Portable-computing device 450 may further include a cellular radio transceiver or WiFi® radio transceiver that may link portable-computing device 450 to the world-wide-web or cloud network 470.

A world-wide-web or cloud network 470 may be linked to wearable-computing device. A base station 480 sends or receives cellular or WiFi® radio transmission to or from portable-computing device 450, respectively. Base station 480 may be coupled to one or more server 490 computing devices. In one embodiment, a multitude of servers may be located in different locations or in multiple clouds. In another embodiment, wearable-computing device 410 may include a cellular radio transceiver or WiFi® radio transceiver directly providing the link to the world-wide-web or cloud network without portable-computing device 450 serving as the intermediary communications link.

In one embodiment, when the location information of the user and the orientation information from wearable-computing device 410 are in the primary information, the location and orientation information and, optionally, the camera or microphone sensor's real partial input, may be correlated to predict a probable ad the user is likely viewing, and/or hearing. The data is then transmitted in the supplemental information to the at least one of wearable-computing device 410 or personal computing device 450 tethered to wearable-computing device 410. The at least one of wearable-computing device 410 or personal computing device 450 tethered to wearable-computing device 410 then may re-create the ad for the user or create a simulated view, e.g., a virtual view, or sound to be seen/heard by the user of the probable advertisement the user should be seeing or hearing. In one embodiment, primary or supplemental information may be modified by time of day, day of the week, user's preferences, user's detected preferences, user's prior activities, or other similar information or variables. In one embodiment, a video or camera sensor is sensed for any possible text input, the text of which is then fed into the data relevance engine input.

Figure 5:
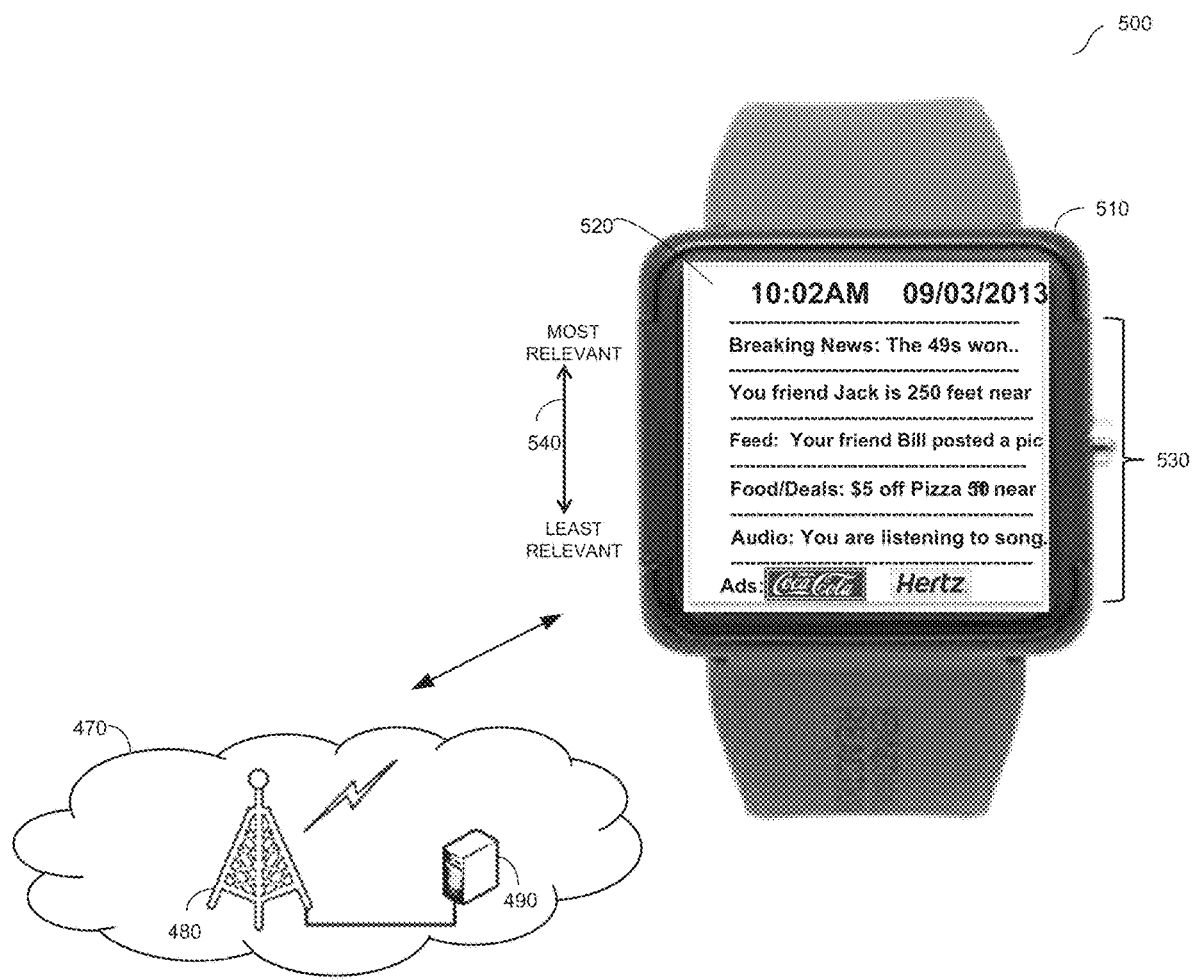
FIG. 5 shows another exemplary system including a wearable computing device and a server, according to one embodiment of the present invention.

FIG. 5 shows another exemplary system including a wearable computing device and a server, according to one embodiment of the present invention. The wearable-computing device 510 includes an exemplary visual display output 520. In this example, wearable-computing device 510 includes a form factor for a wristwatch, wrist band, smartwatch, or the like, with one or more displays. Wearable-computing device 510 may include some of the same features as described in reference to the wearable-computing device 410 with the exception that visual display output 520 is not transparent so as to be worn over the eyes but is instead worn on the user's wrist.

Visual display output 520 includes a time/date display as would be expected for a watch, and a ranked resulting information display area 530. Ranked resulting information display area 530 includes a multitude of display lines and an ad line. Each display line may be associated with a different one of a multitude of information types. The multitude of display lines are ranked with the most relevant displayed at the top and the least relevant at the bottom as shown by graph 540.

In one embodiment one of the multitude of display lines may stream continuously updating the resulting information. In one embodiment one of the multitude of display lines may statically display the resulting information until a predetermined time when the data relevance engine determines the resulting information should be updated due to changes in the information inputs. In one embodiment one of the multitude of display lines may be updated periodically with new information. In one embodiment the ranking of the multitude of display lines may be updated dynamically at predetermined times when the data relevance engine determines a new ranking order is appropriate due to changes in the information inputs.

In this example, the top line of ranked resulting information display area 530 includes a breaking news feed text line that the 49ers football team won. The news the 49ers won may have been selected by the data relevance engine as most relevant based on, for example, multiple signals from the user's social network that the user is interested in the 49ers, and importantly, that wearable-computing device 510 is not presently at the stadium where the 49ers were playing. If wearable-computing device 510 were at the stadium where the 49ers were playing, the user would have already known of their win and the data relevance engine would have considered that information not relevant to display. Thus, the ranking criteria was dynamically analyzed in real time by the data relevance engine using the sensor data on wearable-computing device 510, e.g., GPS location. In one embodiment, other information such as geographical map database, historical information of prior attendance at 49ers games, and/or football team schedules may be included in the analysis by the data relevance engine.

Referring back to FIG. 5, the next line down of ranked resulting information display area 530 includes a text line that the user's friend Jack is 250 feet near, which was captured by the data relevance engine because Jack is also a user of the same data relevance engine, or captured via social network information. Similarly, the next line down of ranked resulting information display area 530 includes a text line that the user's friend Bill posted a picture of relevance on a social network site. The next line down of ranked resulting information display area 530 includes a text line for a discounted food deal for Pizza, determined in one example, because the user's social network site information indicates a liking for Pizza, there is a Pizza restaurant 50 feet from the wearable-computing device 510, and that several of the user's friends have liked the pizza at this nearby restaurant. The next line down of ranked resulting information display area 530 includes a text line for what song is currently being played through wearable-computing device 510 via headphones or other manner.

Display area 530 includes a text line for product or service ads that have been selected by the data relevance engine. These ads may be more meaningful than those selected by previous methods because the primary information from the wearable-computing device 510 provides current geographical location and current user interests in real-time. For example, the wearable-computing device 510 may be at an airport destination, where a car rental need is likely so a car rental company ad is displayed and there is a soft drink dispensing machine nearby so a soft drink ad is displayed. In one embodiment, the audio sensor in wearable-computing device 510 may have picked up the spoken word "thirsty," which was analyzed in real time by the data relevance engine to rank and select the ad category of soft drinks to display.

A world-wide-web or cloud network 470 may be linked to the wearable-computing device 510 represented in FIG. 5. In this example, the wearable-computing device 510 is shown directly communicating with the internet cloud 470, without the need for another intermediary portable-computing device to be tethered nearby.

Figure 6:
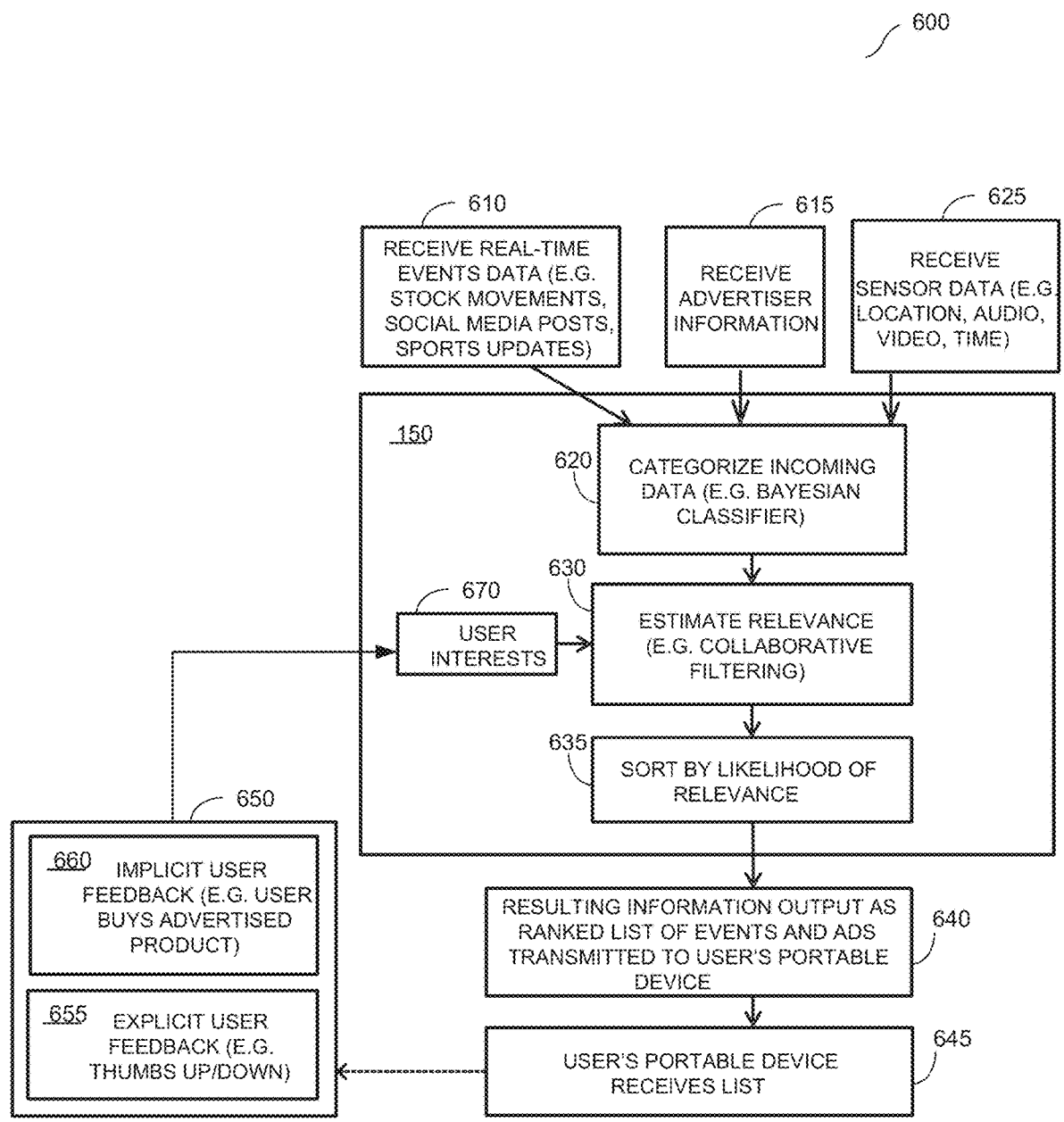
FIG. 6 shows an exemplary block diagram of the information ranking system, according to one embodiment of the present invention.

FIG. 6 shows an exemplary block diagram of the information ranking system, according to one embodiment of the present invention. The data relevance engine 150 receives real-time events data 610 and advertiser information 615 as inputs. The real time events data 610 may include stock movements, social media posts, sports updates, and the like (e.g., the external information 360). At block 620, the incoming real-time events data and/or advertiser information are categorized. In one embodiment, the categorizing step may use a Bayesian classifier, which uses probabilistic statistical technique to minimize the probability of misclassification by using training data to learn over time how to classify the incoming real-time events data and advertiser information correctly. In one embodiment, the categorization of the multitude of incoming real-time events data and advertiser information is used to create a multitude of information display types, such as sports scores, local information such as movie times, local merchant sales information, and the like. In one embodiment, the multitude of information display types may be presented to the user in either different locations within a display, or are rotated/presented to the user over time, e.g., audio streamed in user interest ranking order.

The data relevance engine 150 also receives sensor data 625, e.g., audio, video, location, time, and device information associated with blocks 315, 320, 325, and 330 in FIG. 3, respectively. In one embodiment, the sensor's data may be assigned a numerical weighting with the purpose of giving that sensor's data a relative importance. The numerical weight assigned to any given data input is referred to as the RankWeight for that sensor type. This ranking is not the only algorithm that determines rankings in the output results, but merely one of many factors used to determine ranking of input data at any given time. The RankWeight may be static or dynamic, and may be different for different types of sensors, users, or corresponding to other factors. In one embodiment, more recent primary sensor data, such as voice-recognized words may be given a higher weight (e.g., more relevant) than older data.

The received sensor data and the classified real-time events data and advertiser information is used to estimate 630 relevance or user interest for the data in real-time. In one embodiment, the resulting information may be ranked by a weighted sum approach, or Eigen-vector approach, or any other approach and/or algorithm. In another embodiment, collaborative filtering is used to automatically estimate the relevance for the data. For example, data may be assigned a predicted weight factor (e.g., by filtering) based on matching a multitude of recommendations, e.g., collaboration, from social media friends for data that the user of the portable-computing device has not directly rated. Collaborative filtering leverages the extensive data input from social media and the other extensive secondary data sources that are input to the data relevance engine with high statistical confidence. Therefore, the categorizing 620 incoming data and estimating 630 relevance corresponds to correlating the primary sensor information in real-time with secondary information associated with the user's interests to form the correlated data.

Next, the relevance weighted correlated data is sorted 635 by likelihood of relevance to form the resulting information as a ranked list of events/information and/or ads. In other words, the sorting 635 determines the resulting information.

The resulting information includes a plurality of real-time information ranked by the user-interest and responsive to the first information, which are transmitted from the data relevance engine and received 645 by the user's portable-computing device in real-time.

Below several example of formulas demonstrate how to calculate weighted averages which serves as an element in calculating a point-based total. The weighted mean is similar to an arithmetic mean, e.g., the most common type of average, where instead of each of the data points contributing equally to the final average, some data points contribute more than other data points. The notion of weighted mean plays a role in descriptive statistics and also occurs in a more general form in several other areas of mathematics.

Formally, a weighted mean of a non-empty set of data $\{x_1, x_2, \ldots, x_n\}$, with non-negative weights $\{w_1, w_2, \ldots, w_n\}$, can be written as follows:

$$\bar{x} = \frac{\sum_{i=1}^{n} w_i x_i}{\sum_{j=1}^{n} w_j}, \text{ or } \bar{x} = \frac{w_1 x_1 + w_2 x_2 + \ldots + w_n x_n}{w_1 + w_2 + \ldots + w_n}.$$

Therefore, data elements with a high weight contribute more to the weighted mean than do elements with a low weight. The weights cannot be negative. Some may be zero, but not all of them (since division by zero is not allowed).

The formulas are simplified when the weights are normalized such that they sum up to one (e.g., $\Sigma_{i,i.e.i=1}^{n} w_i = 1$). For such normalized weights, the weighted mean can be written as follows:

$$\bar{x} = \sum_{i=1}^{n} w_i x_i$$

Note that one may normalize the weights by making a transformation on the weights such that $$w_i' = \frac{w_i}{\sum_{j=1}^{n} w_j}.$$

Using the normalized weights yields the same results as when using the original weights. Indeed, $$\bar{x} = \sum_{i=1}^{n} w_i' x_i = \sum_{i=1}^{n} \frac{w_i}{\sum_{j=1}^{n} w_j} x_i = \frac{\sum_{i=1}^{n} w_i x_i}{\sum_{j=1}^{n} w_j} = \frac{\sum_{i=1}^{n} w_i x_i}{\sum_{i=1}^{n} w_i}.$$

The common mean $$\frac{1}{n} \sum_{i=1}^{n} x_i$$

is a special case of the weighted mean where all data have equal weights, $w_i = w$. When the weights are normalized, then $$w'_i = \frac{1}{n}.$$

To take into account variance, the weighted mean of a list of data for which each element $x_i$ comes from a different probability distribution with known variance $\sigma_i^2$, one possible choice for the weights may be written as follows:

$$w_i = \frac{1}{\sigma_i^2}.$$

The weighted mean may then be written as follows:

$$\bar{x} = \frac{\sum_{i=1}^{n}(x_i w_i)}{\sum_{i=1}^{n} w_i},$$

and the variance of the weighted mean may be written as follows:

$$\sigma_{\bar{x}}^2 = \frac{1}{\sum_{i=1}^{n} w_i},$$

which reduces to $$\sigma_{\bar{x}}^2 = \frac{\sigma_0^2}{n},$$

when all $\sigma_i = \sigma_0$.

The significance of this choice is that this weighted mean is the maximum likelihood estimator of the mean of the probability distributions under the assumption that they are independent and normally distributed with the same mean.

Vector-Valued Estimates:

As in the scalar case, the weighted mean of multiple estimates can provide a maximum likelihood estimate. For vector-valued estimates, $\sigma^2$ may be replaced by the covariance matrix, as follows:

$$W_i = \Sigma_i^{-1}.$$

The weighted mean may be written as follows:

$$\bar{x} = \left(\sum_{i=1}^{n} \Sigma_i^{-1}\right)^{-1} \left(\sum_{i=1}^{n} \Sigma_i^{-1} x_i\right),$$

and the covariance of the weighted mean may be written as follows:

$$\Sigma_{\bar{x}} = \left(\sum_{i=1}^{n} \Sigma_i^{-1}\right)^{-1},$$

For example, consider the weighted mean of the point [1 0] with high variance in the second component and [0 1] with high variance in the first component. Then $$x_1 = [1\,0]^\dagger, \Sigma_1 = \begin{bmatrix} 1 & 0 \\ 0 & 100 \end{bmatrix}$$

$$x_2 = [0\,1]^\dagger, \Sigma_2 = \begin{bmatrix} 100 & 0 \\ 0 & 1 \end{bmatrix},$$

Then, the weighted mean may be written as follows:

$$\bar{x} = (\Sigma_1^{-1} + \Sigma_2^{-1})^{-1}(\Sigma_1^{-1} x_1 + \Sigma_2^{-1} x_2)$$

$$= \begin{bmatrix} 0.9901 & 0 \\ 0 & 0.9901 \end{bmatrix} \begin{bmatrix} 1 \\ 1 \end{bmatrix}$$

$$= \begin{bmatrix} 0.9901 \\ 0.9901 \end{bmatrix},$$

in this case, the [1 0] estimate is "compliant" in the second component and the [0 1] estimate is compliant in the first component, so the weighted mean is nearly [1 1].

Another method of calculation takes into account correlations between data elements. In the general case, suppose that $X=[x_1, \ldots, x_n]$, C is the covariance matrix relating the quantities $x_i$, $\bar{x}$ is the common mean to be estimated, and W is the design matrix $[1, \ldots, 1]$ (of length n). The Gauss-Markov theorem states that the estimate of the mean having minimum variance is written as follows:

$$\sigma_{\bar{x}}^2 = (W^T C^{-1} W)^{-1},$$

and $$\bar{x} = \sigma_{\bar{x}}^2 (W^T C^{-1} X).$$

Consider the time series of an independent variable x and a dependent variable y, with n observations sampled at discrete times $t_i$. In many common situations, the value of y at time $t_i$ depends not only on $x_i$ but also on its past values. Commonly, the strength of this dependence decreases as the separation of observations in time increases. To model this situation, one may replace the independent variable by its sliding mean z for a window size m, as follows:

$$z_k \sum_{i=1}^{m} w_i x_{k+1-i},$$

In the scenario described in the previous section, most frequently the decrease in interaction strength obeys a negative exponential law. If the observations are sampled at equidistant times, then exponential decrease is equivalent to decrease by a constant fraction $0<\Delta<1$ at each time step. Setting $w=1=\Delta$, m normalized weights can be defined as follows:

$$w_i = \frac{w^{j-1}}{V_1},$$

where $V_1$ is the sum of the un-normalized weights. In this case $V_1$ can be written as follows:

$$V_1 = \sum_{i=1}^{m} w^{j-1} = \frac{1-w^m}{1-w},$$

In this case, $V_1$ approaches $V_1=1/(1-w)$ for large values of m.

The damping constant w corresponds to the actual decrease of interaction strength. If this cannot be determined from theoretical considerations, then the following properties of exponentially decreasing weights are useful in making a suitable choice: at step $(1-w)^{-1}$, the weight approximately equals to $e^{-1}(1-w)=0.39(1-w)$, the tail area approximately equals to $e^{-1}$, the head area approximately equals to $1-e^{-1}=0.61$. The tail area at step n is $\leq e^{-n(1-w)}$, where primarily the closest n observations matter and the effect of the remaining observations can be ignored safely. Then the damping constant w may be chosen such that the tail area is sufficiently small. It should be noted that the weight calculation methods described above are mere examples, and any other weight calculating and/or ranking method may be used without departing from the teachings of the present disclosure.

Referring back to FIG. 6, in one embodiment, the user may provide active feedback 650 via the portable-computing device. Active feedback 650 may include explicit user feedback 655, e.g., thumbs-up or thumbs-down and/or implicit user feedback 660 based for example on the user purchasing an advertised product or service. The user feedback may shape the user's interests and forms user interest data 670 that is stored in the data relevance engine and is input to estimating 630 the relevance. User interest data 670 may further include historical information, which may be heavily weighted to prefer recent data. Historical information may include prior purchases, location destinations, and the like. In one embodiment, a user's feedback or selections are used to modify/change the weightings of that user's later displayed resulting information. In one embodiment, relevance outputs can be weighted by a user's stated, e.g., explicit user feedback, or detected, e.g., implicit user feedback interests. For example, twitter #hashtags, Facebook Likes, recent social media or email data, a user's friend's Facebook postings, and the like.

In one embodiment, when the primary sensor information is continuously transmitted, the data relevance engine may continuously and/or passively monitor (e.g., "listen"), decode using voice recognition, and correlate words or phrases in conversation within hearing distance of the portable-computing device, to provide real-time user interest information associated with those "heard" words. For example, if the microphone input of the portable-computing device hears the word "hungry," the data relevance engine may automatically display a distance to a restaurant that serves food that is of interest to the user. In another embodiment, when the primary sensor information is continuously transmitted, the data relevance engine may continuously and/or passively monitor, decode and correlate captured video or periodically sampled static visual images in the line-of-sight of the portable-computing device, to provide real time user interest information. In one embodiment, the decoded video or camera image data may include decoded text key words or symbols associated with advertising.

In one embodiment, data such as #hashtags associated with a user's interests, or in another example a list of "likes" associated with a user's interests, are used to correlate and weight data inputs. For example, if a user's wearable-computing-device recognizes (e.g., passively or actively) the words "Italian," then one such resulting output streams may be Italian restaurants in the local area.

In one embodiment, the weighting of the data may be influenced by other relevant people's prior selections. Other relevant people may include people other than the user who may be nearby, friends, or anyone else. Such ranking may be further ranked according to the other relevant person's "distance," e.g., geographic distance, social graph distance, and/or the like, from the user. In one embodiment, tweets, Facebook posts, and other social media or blog or related posts (entries) are used as an inputs into the data relevance engine In one embodiment, the resulting information may not necessarily be displayed or immediately displayed on the same device. A first portion of the multitude of resulting information may be displayed on a first portable-computing device, while a second portion different than the first portion may be displayed on a second portable-computing device different from the first portable-computing device.

In one embodiment, pictures and any resulting text or extracted data, e.g., facial recognition/identification of people captured by the sensors on the user's portable-computing device may be used as primary inputs into the real-time relevance engine. In one embodiment, data from the sensors on the user's portable-computing device are combined and/or correlated with sensor input data from other nearby sensors to increase the confidence of the rank weighting of that sensor's data. Other nearby sensors may include sensors corresponding to other users, or any other fixed sensor that are in close proximity to the user. This combined/correlated sensor data may both increase the confidence of the sensor input when two different nearby sensors are sensing the same inputs, or could decrease the confidence when two nearby sensors are detecting different information.

In one embodiment, an intention detection output from the data relevance engine may be calculated based on a weighted input of factors including; a) real time location sensor data, e.g., what shopping district the portable-computing device and user are in, b) place of business, e.g., what specific store the portable-computing device is in, and c) detected items, e.g., what product packaging the portable-computing device is seeing in real time. In one embodiment, real-time analytics are output from the data relevance engine. Such analytics and/or "intention detection" outputs may be used to improve relevant advertisement selection.

In one embodiment, the multitude of sensor and non-sensor inputs are cross-correlated to confirm real-time relevance, e.g., improving signal to noise ratio. For example, an audio input, e.g., when the phrase "all passengers to gate 70" is registered by the data-relevance engine then user's portable-computer device is likely at an airport, may be correlated with a GPS location input, which also indicates the user's portable-computer device is at an airport, then relevancy to an airport location is further confirmed. In one embodiment, further data may be inferred from other sensor data. For example, a real-time speed may be inferred from the GPS location sensor data. In one embodiment, sensor data, e.g., audio inputs and resulting voice recognition words, associated with a GPS location may be stored and correlated with that GPS location as historical data, such that when another or future user's portable-computer device may be at that same location in the future, then the prior audio input voice recognized words may be used for further relevance inputs or weighting. Such historical data may be discounted by time, e.g., age of the historical data.

Figure 7:
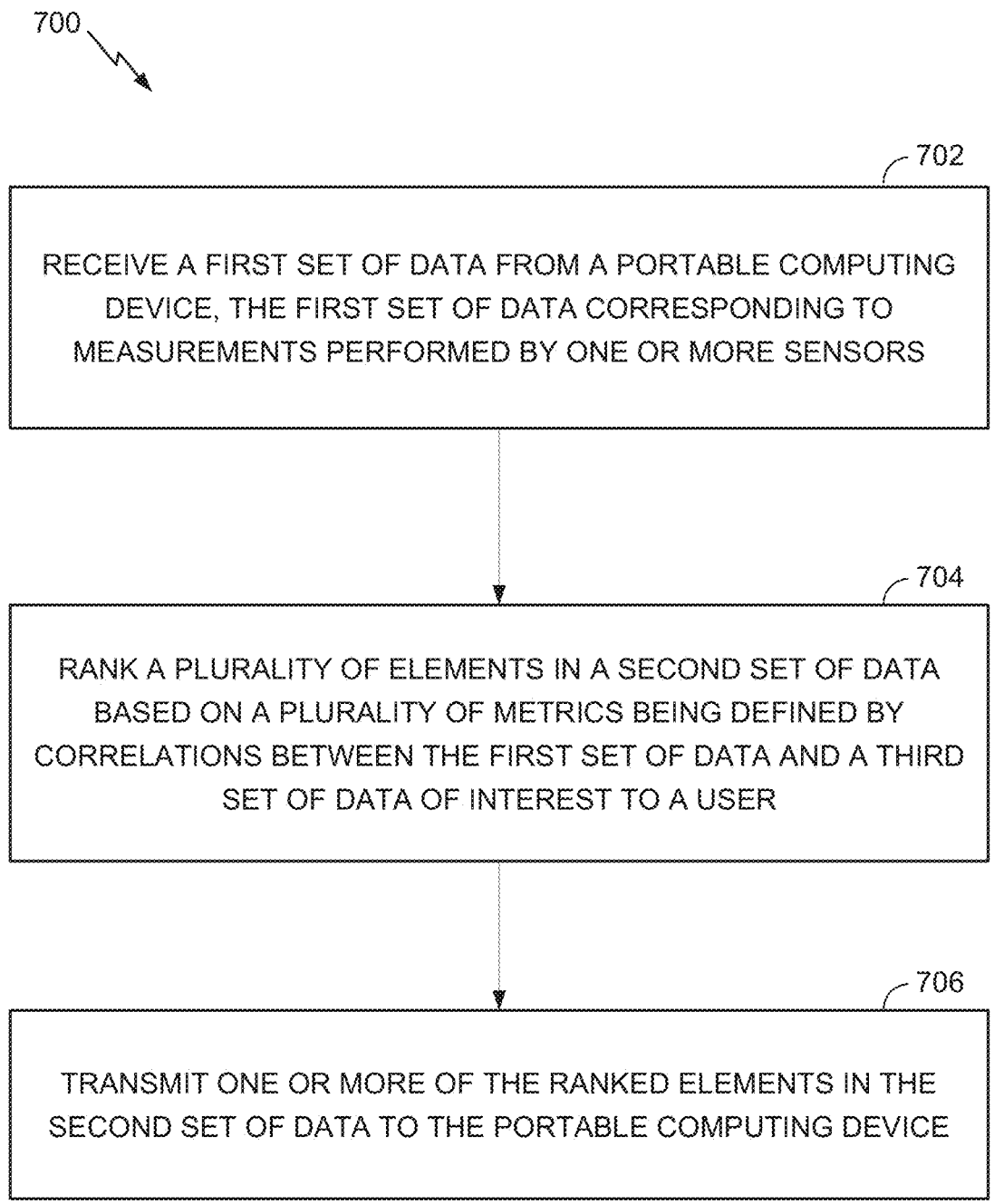
FIG. 7 shows exemplary operations that may be performed by a server, according to one embodiment.

FIG. 7 shows exemplary operations that may be performed by a server, according to one embodiment. At 702, the server receives a first set of data from a portable computing device. In one embodiment, the first set of data corresponds to measurements performed by one or more sensors. At 704, the server ranks multiple of elements in a second set of data (e.g., advertisements, user-specific information, news feed, etc.) based on one or more metrics. The metric may be defined by correlations between the first set of data and a third set of data of interest to a user. At 706, the server transmits one or more of the ranked elements in the second set of data to the portable computing device. The portable computing device may then present the ranked information to the user.

Figure 8:
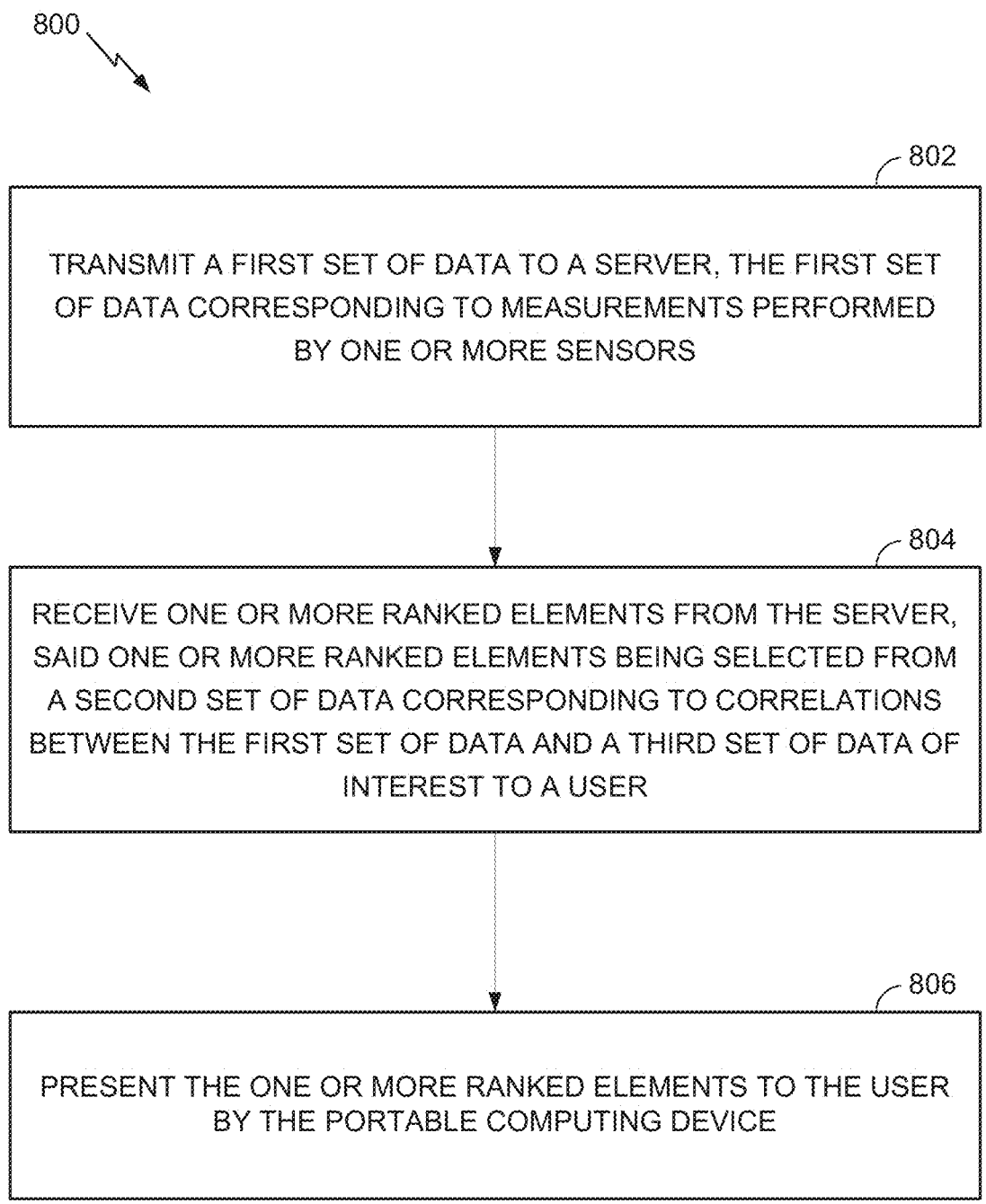
FIG. 8 shows exemplary operations that may be performed by a portable computing device, according to one embodiment of the present invention.

FIG. 8 shows exemplary operations that may be performed by a portable computing device, according to one embodiment of the present invention. At 802, the portable computing device transmits a first set of data to a server. The first set of data may correspond to measurements performed by one or more sensors. At 804, the portable computing device receives one or more ranked elements from the server. The ranked elements are selected from a second set of data corresponding to correlations between the first set of data and a third set of data of interest to a user. At 806, the portable computing device presents the one or more ranked elements to the user.

Figure 9:
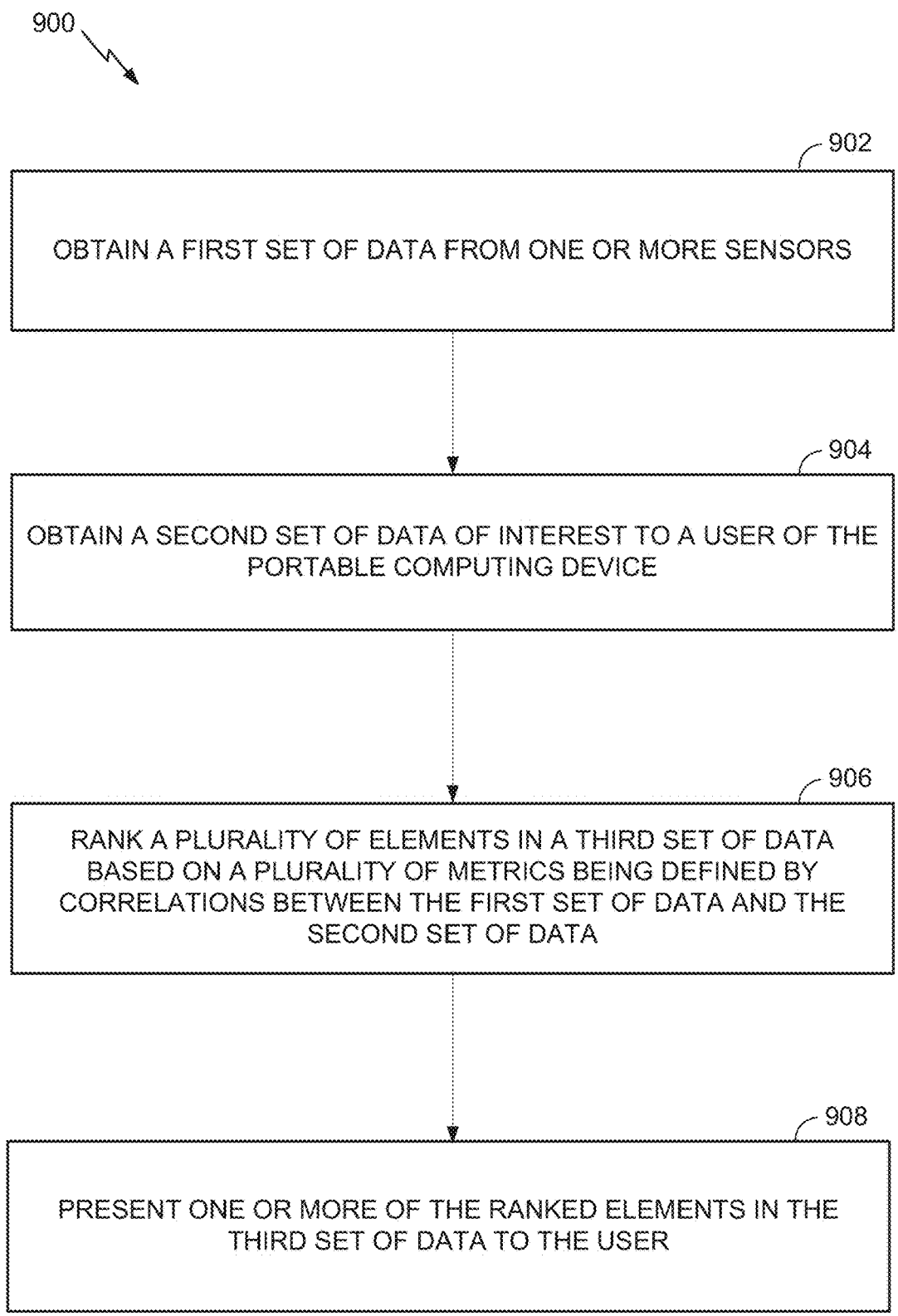
FIG. 9 shows another exemplary operations that may be performed by a portable computing device, according to one embodiment of the present invention.

FIG. 9 shows another exemplary operations that may be performed by a portable computing device, according to one embodiment of the present invention. At 902, the portable computing device obtains a first set of data from one or more sensors. At 904, the portable computing device obtains a second set of data of interest to a user of the portable computing device. At 906, the portable computing device ranks on one or more elements in a third set of data based on one or more metrics. The one or more metrics being defined by correlations between the first set of data and the second set of data. At 908, the portable computing device presents one or more of the ranked elements in the third set of data to the user.

Figure 10:
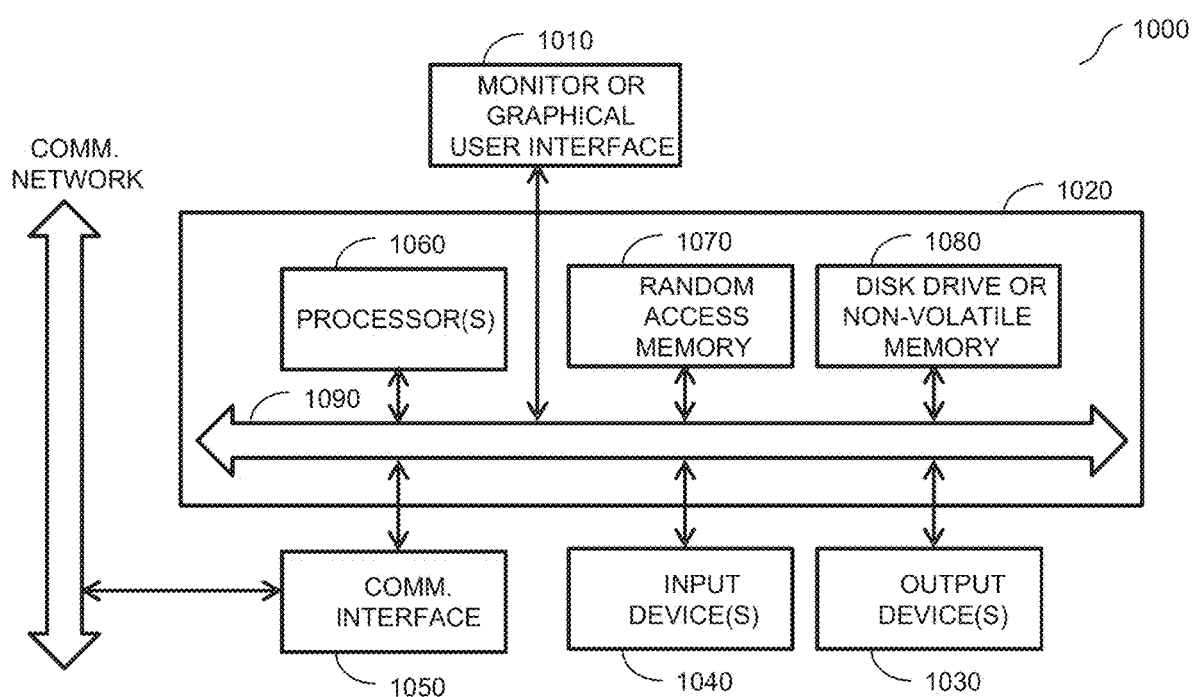
FIG. 10 shows a simplified block diagram of a computer system that may incorporate embodiments of the present invention.

FIG. 10 shows a simplified block diagram of a computer system that may incorporate embodiments of the present invention. FIG. 10 is merely illustrative of an embodiment incorporating the present invention and does not limit the scope of the invention as recited in the claims. One of ordinary skill in the art would recognize other variations, modifications, and alternatives.

In one embodiment, computer system 1000 typically includes a monitor or 1010, a computer 1020, user output devices 1030, user input devices 1040, communications interface 1050, and the like. Computer system 1000 may also be a smart phone, tablet-computing device, and the like, such that the boundary of computer 1020 may enclose monitor or graphical user interface 1010, user output devices 1030, user input devices 1040, and/or communications interface 1050 (not shown).

As shown in FIG. 10, computer 1020 may include a processor(s) 1060 that communicates with a number of peripheral devices via a bus subsystem 1090. These peripheral devices may include user output devices 1030, user input devices 1040, communications interface 1050, and a storage subsystem, such as random access memory (RAM) 1070 and disk drive or non-volatile memory 1080.

User input devices 1030 include all possible types of devices and mechanisms for inputting information to computer system 1020. These may include a keyboard, a keypad, a touch screen incorporated into the display, audio input devices such as voice recognition systems, microphones, and other types of input devices. In various embodiments, user input devices 1030 are typically embodied as a computer mouse, a trackball, a track pad, a joystick, wireless remote, drawing tablet, voice command system, eye tracking system, and the like. User input devices 1030 typically allow a user to select objects, icons, text and the like that appear on the monitor or graphical user interface 1010 via a command such as a click of a button, touch of the display screen, or the like.

User output devices 1040 include all possible types of devices and mechanisms for outputting information from computer 1020. These may include a display (e.g., monitor or graphical user interface 1010), non-visual displays such as audio output devices, etc.

Communications interface 1050 provides an interface to other communication networks and devices. Communications interface 1050 may serve as an interface for receiving data from and transmitting data to other systems. Embodiments of communications interface 1050 typically include an Ethernet card, a modem (telephone, satellite, cable, ISDN), (asynchronous) digital subscriber line (DSL) unit, FireWire interface, USB interface, and the like. For example, communications interface 1050 may be coupled to a computer network, to a FireWire bus, or the like. In other embodiments, communications interfaces 1050 may be physically integrated on the motherboard of computer 1020, and may be a software program, such as soft DSL, or the like. Embodiments of communications interface 1050 may also include a wireless radio transceiver using radio transmission protocols such as Bluetooth®, WiFi®, cellular, and the like.

In various embodiments, computer system 1000 may also include software that enables communications over a network such as the HTTP, TCP/IP, RTP/RTSP protocols, and the like. In alternative embodiments of the present invention, other communications software and transfer protocols may also be used, for example IPX, UDP or the like.

In some embodiment, computer 1020 includes one or more Xeon microprocessors from Intel as processor(s) 1060. Further, one embodiment, computer 1020 includes a UNIX-based operating system. In another embodiment, the processor may be included in an applications processor or part of a system on a chip.

RAM 1070 and disk drive or non-volatile memory 1080 are examples of tangible media configured to store data such as embodiments of the present invention, including executable computer code, human readable code, or the like. Other types of tangible media include floppy disks, removable hard disks, optical storage media such as CD-ROMS, DVDs and bar codes, semiconductor memories such as flash memories, read-only-memories (ROMS), battery-backed volatile memories, networked storage devices, and the like. RAM 1070 and disk drive or non-volatile memory 1080 may be configured to store the basic programming and data constructs that provide the functionality of the present invention.

Software code modules and instructions that provide the functionality of the present invention may be stored in RAM 1070 and disk drive or non-volatile memory 1080. These software modules may be executed by processor(s) 1060. RAM 1070 and disk drive or non-volatile memory 1080 may also provide a repository for storing data used in accordance with the present invention.

RAM 1070 and disk drive or non-volatile memory 1080 may include a number of memories including a main random access memory (RAM) for storage of instructions and data during program execution and a read only memory (ROM) in which fixed instructions are stored. RAM 1070 and disk drive or non-volatile memory 1080 may include a file storage subsystem providing persistent (non-volatile) storage for program and data files. RAM 1070 and disk drive or non-volatile memory 1080 may also include removable storage systems, such as removable flash memory.

Bus subsystem 1090 provides a mechanism for letting the various components and subsystems of computer 1020 communicate with each other as intended. Although bus subsystem 1090 is shown schematically as a single bus, alternative embodiments of the bus subsystem may utilize multiple busses.

FIG. 10 is representative of a computer system capable of embodying a portion of the present invention. It will be readily apparent to one of ordinary skill in the art that many other hardware and software configurations are suitable for use with the present invention. For example, the computer may be a desktop, laptop, portable, rack-mounted, smart phone or tablet configuration. Additionally, the computer may be a series of networked computers. Further, the use of other microprocessors are contemplated, such as Pentium™ or Itanium™ microprocessors; Opteron™ or AthlonXP™ microprocessors from Advanced Micro Devices, Inc; embedded processors such as ARM® licensed from ARM® Holdings plc., and the like. Further, other types of operating systems are contemplated, such as Windows®, WindowsXP®, WindowsNT®, WindowsRT® or the like from Microsoft Corporation, Solaris from Sun Microsystems, LINUX, UNIX, or mobile operating systems such as Android® from Google Inc., iOS® from Apple Inc., Symbion® from Nokia Corp., and the like. In still other embodiments, the techniques described above may be implemented upon a chip or an auxiliary processing board.

Various embodiments of the present invention can be implemented in the form of logic in software or hardware or a combination of both. The logic may be stored in a computer readable or machine-readable non-transitory storage medium as a set of instructions adapted to direct a processor of a computer system to perform a set of steps disclosed in embodiments of the present invention. The logic may form part of a computer program product adapted to direct an information-processing device to perform a set of steps disclosed in embodiments of the present invention. Based on the disclosure and teachings provided herein, a person of ordinary skill in the art will appreciate other ways and/or methods to implement the present invention.

The above embodiments of the present invention are illustrative and not limiting. The above embodiments of the present invention may be combined, in one or multiple combinations, as various alternatives and equivalents are possible. Although, the invention has been described with reference to a wearable-computing device such as a smart-watch by way of an example, it is understood that the invention is not limited by the type of wearable device. Although, the invention has been described with reference to certain radio communications interface by way of an example, it is understood that the invention is not limited by the type of radio, wireless, or wired communications interface. Although, the invention has been described with reference to certain operating systems by way of an example, it is understood that the invention is not limited by the type of operating systems. Other additions, subtractions, or modifications are obvious in view of the present disclosure and are intended to fall within the scope of the appended claims.

What is claimed is:

1. A method for providing, via a server, a ranked stream of data to present information to a user, the method comprising:
    receiving a first set of data from a portable computing device, at least a portion of the first set of data originating from a wearable computing device, the wearable computing device wirelessly tethered to the portable computing device, the first set of data corresponding to measurements performed by one or more sensors, at least one of the one or more sensors being a Global Positioning System (GPS) receiver, the first set of data comprising at least a GPS location derived from GPS location information;
    ranking a plurality of elements in a second set of data based on a plurality of metrics defined by correlations between the GPS location of the first set of data and a third set of data of interest to a user, the ranking of the plurality of elements being a function of each of a weight associated with the GPS location, a weight associated with a particular sensor from which particular data originated, the particular data being audio data or video data, and a weight associated with a time at which the particular data was received, wherein the weight associated with the time being a function of a damping constant configured to assign a higher weight to new sensor data than to older sensor data; and
    transmitting one or more of the ranked elements in the second set of data to the portable computing device or the wearable computing device, each of the one or more ranked elements including an associated actionable link configured to, upon selection, cause the portable computing device to take an associated action.

2. The method of claim 1, further comprising:
    receiving the third set of data from the portable computing device.

3. The method of claim 1, further comprises: determining that a new ranking order is necessary due to one or more changes in at least one of the first set of data corresponding to measurements performed by one or more sensors.

4. The method of claim 1, wherein the third set of data further comprises information corresponding to social network activities of one or more users associated with the user in a social network.

5. The method of claim 1, wherein ranking the plurality of elements in the second set of data comprises:
    categorizing the plurality of elements in the second set of data using a classifying algorithm; and
    generating the plurality of metrics corresponding to the plurality of elements using a collaborative filtering algorithm.

6. The method of claim 1, further comprising:
    receiving a feedback from the portable computing device corresponding to at least one of the elements in the third set of data; and
    updating the plurality of metrics in accordance with the feedback.

7. The method of claim 1, wherein the server is a cloud computing server.

8. The method of claim 1, wherein the second set of data comprises advertisement information.

9. The method of claim 1, wherein the plurality of elements in a second set of data are ranked in real-time.

10. A method for obtaining a ranked stream of data by a portable computing device, the method comprising:
    transmitting a first set of data to a server, at least a portion of the first set of data originating from a wearable computing device, the wearable computing device wirelessly tethered to the portable computing device, the first set of data corresponding to measurements performed by one or more sensors, at least one of the one or more sensors being a Global Positioning System (GPS) receiver, the first set of data comprising at least a GPS location derived from GPS location information;
    receiving one or more ranked elements from the server, said one or more ranked elements being selected from a second set of data corresponding to correlations between the GPS location of the first set of data and a third set of data of interest to a user, ranking of the plurality of elements being a function of each of a weight associated with the GPS location, a weight associated with a particular sensor from which particular data originated, the particular data being audio data or video data, and a weight associated with a time at which the particular data was received, wherein the weight associated with the time being a function of a damping constant configured to assign a higher weight to new sensor data than to older sensor data; and presenting the one or more ranked elements to the user by the portable computing device or the wearable computing device, each of the one or more ranked elements including an associated actionable link configured to, upon selection, cause the portable computing device to take an associated action.

11. The method of claim 10, further comprising:
transmitting the third set of data to the server.

12. The method of claim 10, wherein the third set of data comprises information corresponding to social network activities of the user.

13. The method of claim 10, wherein the third set of data further comprises information corresponding to social network activities of one or more users associated with the user in a social network.

14. The method of claim 10, further comprising:
transmitting a feedback corresponding to at least one of the presented elements to the server; and
receiving a set of updated elements from the server.

15. The method of claim 10, wherein at least one of the one or more sensors is disposed in a device communicatively coupled to the portable computing device.

16. The method of claim 10, wherein the one or more ranked elements comprise advertisement information.

17. The method of claim 10, wherein the one or more ranked elements are presented to the user in real-time.

18. A method for providing, via a server, a ranked stream of data to present information to a user, the method comprising:
obtaining a first set of data from one or more sensors, at least a portion of the first set of data originating from a wearable computing device, the wearable computing device wirelessly tethered to the portable computing device, at least one of the one or more sensors being a Global Positioning System (GPS) receiver, the first set of data comprising at least a GPS location derived from GPS location information;
obtaining a second set of data of interest to a user of the portable computing device;
ranking a plurality of elements in a third set of data based on a plurality of metrics defined by correlations between the GPS location of the first set of data and the second set of data, the ranking of the plurality of elements being a function each of a weight associated with the GPS location, a weight associated with a particular sensor from which particular data originated, the particular data being audio data or video data, and a weight associated with a time at which the particular data was received, wherein the weight associated with the time being a function of a damping constant configured to assign a higher weight to new sensor data than to older sensor data; and
presenting one or more of the ranked elements in the third set of data to the user or the wearable computing device, each of the one or more ranked elements including an associated actionable link configured to, upon selection, cause the portable computing device to take an associated action.

19. The method of claim 18, wherein the second set of data comprises information corresponding to social network activities of the user.

20. The method of claim 18, wherein ranking the plurality of elements in the third set of data comprises:
categorizing the plurality of elements in the third set of data using a classifying algorithm; and
generating the plurality of metrics corresponding to the plurality of elements using a collaborative filtering algorithm.

21. The method of claim 18, further comprising:
receiving a feedback from the user corresponding to at least one of the presented elements; and
updating the plurality of metrics in accordance with the feedback.

22. The method of claim 18, wherein the third set of data comprises advertisement information.

23. The method of claim 18, wherein at least one of the one or more sensors is disposed in a device communicatively coupled to the portable computing device.

24. The method of claim 18, wherein the one or more ranked elements are presented to the user in real-time.

25. A computer system configured to:
receive a first set of data from a portable computing device, at least a portion of the first set of data originating from a wearable computing device, the wearable computing device wirelessly tethered to the portable computing device, the first set of data corresponding to measurements performed by one or more sensors, at least one of the one or more sensors being a Global Positioning System (GPS) receiver, the first set of data comprising at least a GPS location derived from GPS location information;
rank a plurality of elements in a second set of data based on a plurality of metrics defined by correlations between the GPS location of the first set of data and a third set of data of interest to a user, the ranking of the plurality of elements being a function of each of a weight associated with the GPS location, a weight associated with a particular sensor from which particular data originated, the particular data being audio data or video data, and a weight associated with a time at which the particular data was received, wherein the weight associated with the time being a function of a damping constant configured to assign a higher weight to new sensor data than to older sensor data; and
transmit one or more of the ranked elements in the second set of data to the portable computing device or the wearable computing device, each of the one or more ranked elements including an associated actionable link configured to, upon selection, cause the portable computing device to take an associated action.

26. The computer system of claim 25, further configured to receive the third set of data from the portable computing device.

27. The computer system of claim 25, wherein the third set of data comprises information corresponding to social network activities of the user.

28. The computer system of claim 25, wherein the third set of data further comprises information corresponding to social network activities of one or more users associated with the user in a social network.

29. The computer system of claim 25, further configured to:
 categorize the plurality of elements in the second set of data using a classifying algorithm; and
 generate the plurality of metrics corresponding to the plurality of elements using a collaborative filtering algorithm.

30. The computer system of claim 25, further configured to receive a feedback from the portable computing device corresponding to at least one of the elements in the third set of data, and update the plurality of metrics in accordance with the feedback.

31. The computer system of claim 25, wherein the computer system is a cloud computing server.

32. The computer system of claim 25, wherein the second set of data comprises advertisement information.

33. The computer system of claim 25, further configured to rank the plurality of elements in the second set of data in real-time.

34. A portable communication/computing device configured to:
 transmit a first set of data to a server, at least a portion of the first set of data originating from a wearable computing device, the wearable computing device wirelessly tethered to the portable computing device, the first set of data corresponding to measurements performed by one or more sensors, at least one of the one or more sensors being a Global Positioning System (GPS) receiver, the first set of data comprising at least a GPS location derived from GPS location information;
 receive one or more ranked elements from the server, said one or more ranked elements being selected from a second set of data corresponding to correlations between the GPS location of the first set of data and a third set of data of interest to a user, the ranking of the plurality of elements being a function of each of a weight associated with the GPS location, a weight associated with a particular sensor from which particular data originated, the particular data being audio data or video data, and a weight associated with a time at which the particular data was received, wherein the weight associated with the time being a function of a damping constant configured to assign a higher weight to new sensor data than to older sensor data; and
 present the one or more ranked elements to the user or the wearable computing device, each of the one or more ranked elements including an associated actionable link configured to, upon selection, cause the portable computing device to take an associated action.

35. The portable communication/computing device of claim 34, further configured to transmit the third set of data to the server.

36. The portable communication/computing device of claim 34, wherein the third set of data comprises information corresponding to social network activities of the user.

37. The portable communication/computing device of claim 34, wherein the third set of data further comprises information corresponding to social network activities of one or more users associated with the user in a social network.

38. The portable communication/computing device of claim 34, further configured to transmit a feedback corresponding to at least one of the presented elements to the server, and receive a set of updated elements from the server.

39. The portable communication/computing device of claim 34, wherein at least one of the one or more sensors is disposed in a device communicatively coupled to the portable communication/computing device.

40. The portable communication/computing device of claim 34, wherein the one or more ranked elements comprise advertisement information.

41. The portable communication/computing device of claim 34, wherein the one or more ranked elements are presented to the user in real-time.

42. A portable communication/computing device configured to:
 obtain a first set of data from one or more sensors, at least a portion of the first set of data originating from a wearable computing device, the wearable computing device wirelessly tethered to the portable computing device, at least one of the one or more sensors being a Global Positioning System (GPS) receiver, the first set of data comprising at least a GPS location derived from GPS location information;
 obtain a second set of data of interest to a user of the portable communication/computing device;
 rank a plurality of elements in a third set of data based on a plurality of metrics defined by correlations between the GPS location of the first set of data and the second set of data, the ranking of the plurality of elements being a function of each of a weight associated with the GPS location, a weight associated with a particular sensor from which particular data originated, the particular data being audio data or video data, and a weight associated with a time at which the particular data was received, wherein the weight associated with the time being a function of a damping constant configured to assign a higher weight to new sensor data than to older sensor data; and
 present one or more of the ranked elements in the third set of data to the user or the wearable computing device, each of the one or more ranked elements including an associated actionable link configured to, upon selection, cause the portable computing device to take an associated action.

43. The portable communication/computing device of claim 42, wherein the second set of data comprises information corresponding to social network activities of the user.

44. The portable communication/computing device of claim 42, further configured to:
 categorize the plurality of elements in the third set of data using a classifying algorithm; and
 generate the plurality of metrics corresponding to the plurality of elements using a collaborative filtering algorithm.

45. The portable communication/computing device of claim 42, further configured to receive a feedback from the user corresponding to at least one of the presented elements, and update the plurality of metrics in accordance with the feedback.

46. The portable communication/computing device of claim 42, wherein the third set of data comprises advertisement information.

47. The portable communication/computing device of claim 42, wherein at least one of the one or more sensors is disposed in a device communicatively coupled to the portable communication/computing device.

48. The portable communication/computing device of claim 42, wherein the one or more ranked elements are presented to the user in real-time.

49. A non-transitory computer-readable medium comprising computer readable instructions configured to cause a processor to:
- receive a first set of data from a portable computing device, at least a portion of the first set of data originating from a wearable computing device, the wearable computing device wirelessly tethered to the portable computing device, the first set of data corresponding to measurements performed by one or more sensors, at least one of the one or more sensors being a Global Positioning System (GPS) receiver, the first set of data comprising at least a GPS location derived from GPS location information;
- rank a plurality of elements in a second set of data based on a plurality of metrics defined by correlations between the GPS location of the first set of data and a third set of data of interest to a user, the ranking of the plurality of elements being a function of each of a weight associated with the GPS location, a weight associated with a particular sensor from which particular data originated, the particular data being audio data or video data, and a weight associated with a time at which the particular data was received, wherein the weight associated with the time being a function of a damping constant configured to assign a higher weight to new sensor data than to older sensor data; and
- transmit one or more of the ranked elements in the second set of data to the portable computing device or the wearable computing device, each of the one or more ranked elements including an associated actionable link configured to, upon selection, cause the portable computing device to take an associated action.

50. A non-transitory computer-readable medium comprising computer readable instructions configured to cause a processor to:
- transmit a first set of data to a server, at least a portion of the first set of data originating from a wearable computing device, the wearable computing device wirelessly tethered to a portable computing device, the first set of data corresponding to measurements performed by one or more sensors, at least one of the one or more sensors being a Global Positioning System (GPS) receiver, the first set of data comprising at least a GPS location derived from GPS location information;
- receive one or more ranked elements from the server, said one or more ranked elements being selected from a second set of data corresponding to correlations between the GPS location of the first set of data and a third set of data of interest to a user, the ranking of the plurality of elements being a function of each of a weight associated with the GPS location, a weight associated with a particular sensor from which particular data originated, the particular data being audio data or video data, and a weight associated with a time at which the particular data was received, wherein the weight associated with the time being a function of a damping constant configured to assign a higher weight to new sensor data than to older sensor data; and
- present the one or more ranked elements to the user via the portable computing device or the wearable computing device, each of the one or more ranked elements including an associated actionable link configured to, upon selection, cause the portable computing device to take an associated action.

51. A non-transitory computer-readable medium comprising computer readable instructions configured to cause a processor to:
- obtain a first set of data from one or more sensors, at least a portion of the first set of data originating from a wearable computing device, the wearable computing device wirelessly tethered to a portable computing device, at least one of the one or more sensors being a Global Positioning System (GPS) receiver, the first set of data comprising at least a GPS location derived from GPS location information;
- obtain a second set of data of interest to a user of a portable computing device;
- rank a plurality of elements in a third set of data based on a plurality of metrics defined by correlations between the GPS location of the first set of data and the second set of data, the ranking of the plurality of elements being a function of each of a weight associated with the GPS location, a weight associated with a particular sensor from which particular data originated, the particular data being audio data or video data, and a weight associated with a time at which the particular data was received, wherein the weight associated with the time being a function of a damping constant configured to assign a higher weight to new sensor data than to older sensor data; and
- present one or more of the ranked elements in the third set of data to the user.

* * * * *